(12) United States Patent
Ichinose et al.

(10) Patent No.: US 9,067,538 B2
(45) Date of Patent: Jun. 30, 2015

(54) DRIVE ASSIST DISPLAY APPARATUS

(75) Inventors: Tadao Ichinose, Kanagawa (JP); Koji Takahashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/611,838

(22) Filed: Sep. 12, 2012

(65) Prior Publication Data

US 2013/0044217 A1 Feb. 21, 2013

Related U.S. Application Data

(63) Continuation of application No. PCT/JP2011/001846, filed on Mar. 29, 2011.

(30) Foreign Application Priority Data

Nov. 29, 2010 (JP) ................................ 2010-265154

(51) Int. Cl.
*H04N 7/00* (2011.01)
*B60R 1/00* (2006.01)
*B62D 15/02* (2006.01)

(52) U.S. Cl.
CPC ............. *B60R 1/00* (2013.01); *B60R 2300/105* (2013.01); *B60R 2300/303* (2013.01); *B60R 2300/806* (2013.01); *B62D 15/0275* (2013.01)

(58) Field of Classification Search
CPC ................. B60K 2350/1004; B60K 2350/106; B60K 2350/1084; B60K 2350/2013; B60K 35/00; B60Q 1/0023; B60Q 1/484; B60Q 9/005; B60Q 9/007; B60R 1/00; B60R 2300/102; B60R 2300/103; B60R 2300/105; B60R 2300/106; B60R 2300/207; B60R 2300/107; B60R 2300/303; B60R 2300/305; B60R 2300/60; B60R 2300/607; B60R 2300/802; B60R 2300/806; B60R 2300/8066; B60R 2300/8086; B62D 15/0275; G06T 15/20; G06T 5/006; H04N 7/18

USPC ................. 340/937, 435, 436, 438, 439, 461; 348/E7.085, 148, E7.086, 118, 218.1, 348/61; 345/70; 701/1, 301, 431, 472; 382/104, 282, 293
See application file for complete search history.

(56) References Cited

U.S. PATENT DOCUMENTS

| | | | |
|---|---|---|---|
| 6,369,701 B1 * | 4/2002 | Yoshida et al. ............... 340/435 |
| 7,256,688 B2 | 8/2007 | Mizusawa | |
| 2004/0150589 A1 * | 8/2004 | Mizusawa ....................... 345/70 |
| 2006/0274147 A1 * | 12/2006 | Chinomi et al. .............. 348/118 |

(Continued)

FOREIGN PATENT DOCUMENTS

| JP | 2003-104145 A | 4/2003 |
|---|---|---|
| JP | 2003-149711 A | 5/2003 |

(Continued)

OTHER PUBLICATIONS

International Search Report for PCT/JP2011/001846 dated Jun. 7, 2011.

*Primary Examiner* — Sath V Perungavoor
*Assistant Examiner* — Dakshesh Parikh
(74) *Attorney, Agent, or Firm* — Pearne & Gordon LLP

(57) ABSTRACT

Provided is a drive assist display apparatus which displays a main view 20 showing an image of a wide backward area of the vehicle, and a sub view 21-3 showing a view point conversion image of a vicinity of the vehicle 1 as if looked down from a virtual viewpoint, the sub view 21-3 having a down side region where a thickness of the view point conversion image of the bumper 13 from the taken image is moderately represented and left and right side regions except the region of the bumper 13 where a taken image of an area around the vehicle is substantially shown, the sub view 21-3 formed as provided with a cutout section having a width corresponding to a width of the vehicle in accordance with a reduction scale of the view point conversion image, and the cutout section having sides rounded in form.

1 Claim, 12 Drawing Sheets

(56) References Cited

U.S. PATENT DOCUMENTS

2009/0122140 A1  5/2009  Imamura
2011/0095910 A1  4/2011  Takano

FOREIGN PATENT DOCUMENTS

| | | |
|---|---|---|
| JP | 2005-167638 A | 6/2005 |
| JP | 2007-168560 A | 7/2007 |
| JP | 2007-230371 A | 9/2007 |
| JP | 2008-153882 A | 7/2008 |
| JP | 2008-227646 A | 9/2008 |
| JP | 2009-023471 A | 2/2009 |
| JP | 2009-118415 A | 5/2009 |
| JP | 2009-298178 A | 12/2009 |

* cited by examiner

DRIVE ASSIST DISPLAY APPARATUS

TECHNICAL FIELD

The present invention relates to a drive assist display apparatus for performing image processing to provide a driver with an image taken backwardly or forwardly from a vehicle by a vehicle-mounted camera.

BACKGROUND ART

There have so far been proposed a wide variety of drive assist display apparatuses for providing a driver with an image taken by a vehicle-mounted camera mounted on such as a rear trunk or a front grille of a vehicle to make the driver sense a backward or a forward of the vehicle.

The conventional drive assist display apparatus is designed to operate a variety of image display methods of, for example, correcting the image for the influence of the deformation of a lens, and converting the image as if taken from any virtual viewpoint.

The conventional drive assist display apparatus of this type is disclosed in a Patent Literature 1.

The Patent Literature 1 discloses a sub view having a display form of a simple rectangle. FIGS. 10 and 12 exemplify two processed images each relating to a display range of a view point conversion image shown in the sub view.

In each of FIGS. 10 and 12, the reference sign 20 indicates a main view showing an image of a wide backward area of the vehicle, the image assumed to be clipped from the taken image.

In FIG. 10, the reference sign 21-1 indicates the sub view showing an image of an area having a width about twice the width of the vehicle, the image obtained by a view point conversion at a vicinity area of the vehicle from the taken image.

In FIG. 12, the reference sign 21-2 indicates the sub view showing an image of an area having a width that at most allows white side lines of a parking space to be displayed, the image obtained by the view point conversion at the vicinity area of the vehicle from the taken image.

In each of FIGS. 10 and 12, the reference signs 22-1 and 22-2 indicate mask picture views filling spaces between the main and sub views without showing any taken image.

In regard to these examples of the processed images, it will be hereinafter explained how the taken image is displayed under a detailed imaging condition.

Firstly described will be a positional relationship between the vehicle-mounted camera constituting a imaging section and the vehicle having the vehicle-mounted camera mounted therein.

The positional relationship is exemplified in each of FIGS. 4 and 5. FIG. 4 shows an overhead view of the backward of the vehicle 1. FIG. 5 shows a side view of the backward of the vehicle 1.

It is assumed that an image of a vicinity of a parking lot is taken.

FIG. 6 shows an example of the parking lot with white lines forming three isometric parking spaces, and isometric vehicles respectively parked in the left and right parking spaces. The reference signs 17-1 and 17-2 indicate the respective parked vehicles each having a height of 1.5 m and assumed to have a shape of a cuboid for better understanding of the present invention.

FIG. 7 shows a positional relationship between the parking lot shown in FIG. 6 and the vehicle 1 trying to park backwardly into the center parking space 16-3.

FIG. 8 shows the taken image before performing an image processing under the state shown in FIG. 7. In this example, the vehicle-mounted camera has a wide-angle lens to take the image of the wide area. Accordingly, the taken image has an image circle 19 appear therein.

In regard to the taken image shown in FIG. 8, the display image is shown as FIG. 10 in accordance with the example shown in FIG. 9.

In FIG. 10, the main view 20 shows the images obtained by cutting away left, right, top and bottom parts from the taken image shown in FIG. 8. In detail, the main view 20 shows an image of an imaging range that moderately covers a part of a bumper 13 of the vehicle 1 in a down side region and parts of the vehicles respectively parked in the left and right parking spaces in an up side region, and has an angle of view about 160 degrees between left and right sides.

In FIG. 10, the sub view 21-1 shows the view point conversion image of the vicinity of the vehicle 1 as if looked down from the virtual viewpoint, and the view point conversion image includes images about half of the vehicles 17-1 and 17-2 in respective left and right side regions.

In general, the whole image of the backward of the vehicle is horizontally flipped before displaying. However, in the description, the whole image of the backward of the vehicle is not horizontally flipped before displaying for better understanding of a left-to-right relationship in the taken image and the display image. Accordingly, the left-to-right relationship regarding the vehicle-mounted camera 2 is same as that of the displayed image.

CITATION LIST

Patent Literature

[PTL 1]
Patent Literature 1: Japanese Patent Laid-Open Publication 2003-104145

SUMMARY OF INVENTION

Technical Problem

However, the display form of the sub view disclosed in the Patent Literature 1 encounters such a problem that the display range of the sub view 21-1 is wide relative to the width of the vehicle 1 as exemplified in FIG. 10. This leads to the fact that the bumper 13 having a height from a horizontal ground surface 14 and a real vehicle width of 1.8 m is displayed wider than the center parking space 16-3 having a width of 2.5 m in the view point conversion image.

Accordingly, the conventional display form of the sub view has a problem to make an impression on a driver that the vehicle 1 collides with the vehicles 17-1 and 17-2 parked in the respective left and right parking spaces if the vehicle 1 travels backward with the current posture.

It is, therefore, a subject of the present invention to provide a drive assist display apparatus which can display the sub view showing an image of the imaging range needed for the parking point adjustment, and make an easy recognition of the accurate width of the vehicle.

Solution to Problem

According to one aspect of the present invention to resolve the conventional problems above mentioned, there is provided a drive assist display apparatus comprises: one or more imaging sections operable to take an image of a wide area of one of rear and front of a vehicle; an image processing section operable to create a main view showing an image of a wide area around the vehicle by clipping or correcting from the image taken by the imaging sections, create a sub view showing a view point conversion image of a vicinity of the vehicle from the image taken by the imaging sections as if looked down from a virtual viewpoint, combine the main view with the sub view, and fill a space with a mask picture; and an image displaying section operable to display the image processed by the image processing section, wherein: the drive assist display apparatus is designed to display the sub view to show the view point conversion image including an view point conversion image of the vehicle from the taken image; and the sub view is formed as provided with a cutout section corresponding to a part of the vehicle, the cutout section having a width corresponding to a width of the vehicle in accordance with a reduction scale of the view point conversion image.

In accordance with the above construction, the sub view can represent the width of the vehicle in accordance with the reduction scale of the view point conversion image by use of an image of the fixed part of the vehicle from the view point conversion image of the area including the vicinity of the vehicle.

The drive assist display apparatus may be designed to make sides of the cutout section round in form.

In accordance with the above construction, the form of the vehicle shown in the cutout section can be closed, to the form of the real vehicle.

Advantageous Effects of Invention

As mentioned above, the drive assist display apparatus of the present invention can show the image of the part of the actually taken vehicle in sub view, thereby leading to the fact that the image of the vehicle is displayed in actual color and brightness at the time of imaging. Therefore, the image of the vehicle can be easily recognized. In addition, the drive assist display apparatus of the present invention can represent the width of the easily recognized part of the vehicle in accordance with a reduction scale of the view point conversion image, thereby leading to the fact that the size of the vehicle can be correctly recognized.

Furthermore, the drive assist display apparatus of the present invention is designed to make round in farm of a part representing the width between left and right sides as the part of the vehicle in the sub view. Therefore, the image of the part of the vehicle can be further easily recognized.

DESCRIPTION OF EMBODIMENTS

The embodiments of the present invention will be described hereinafter with reference to the drawings.

First Embodiment

Figure 1:
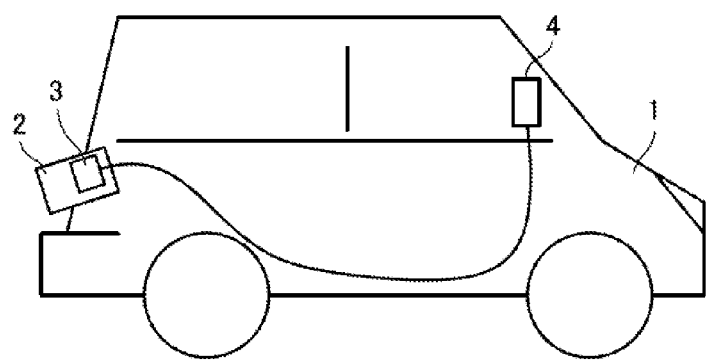
FIG. 1 is a configuration diagram showing a construction of the drive assist display apparatus according to first and second embodiments of the present invention.

FIG. 1 is a configuration diagram of the first embodiment of the present invention.

As shown in FIG. 1, the reference sign 1 indicates a vehicle mounting a drive assist display apparatus therein, the reference sign 2 indicates a vehicle-mounted camera having a wide-angle lens for taking an image of a wide area and the reference sign 3 indicates an image processing section accommodated in the vehicle-mounted camera 2. The image processing section 3 is operable to create a main view showing an image of a wide area around the vehicle by clipping or correcting from the image taken by the vehicle-mounted camera 2, create a sub view showing a view point conversion image of a vicinity of the vehicle from the image taken by the vehicle-mounted camera 2 as if looked down from a virtual viewpoint, combine the main view with the sub view, and fill a space with a mask picture. The reference sign 4 indicates a monitor for displaying the image processed by the image processing section 3.

Figure 2:
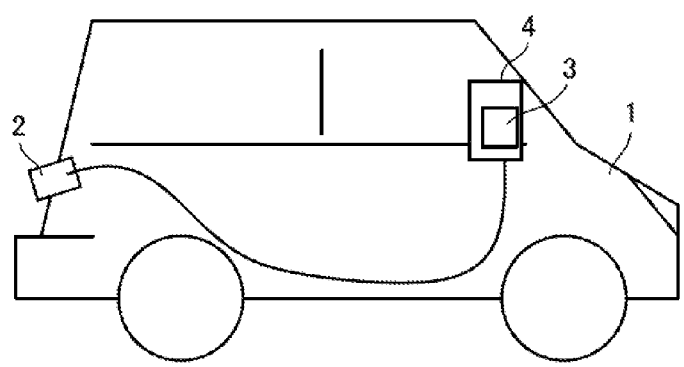
FIG. 2 is a configuration diagram showing a construction of the drive assist display apparatus according to first and second embodiments of the present invention.
Figure 3:
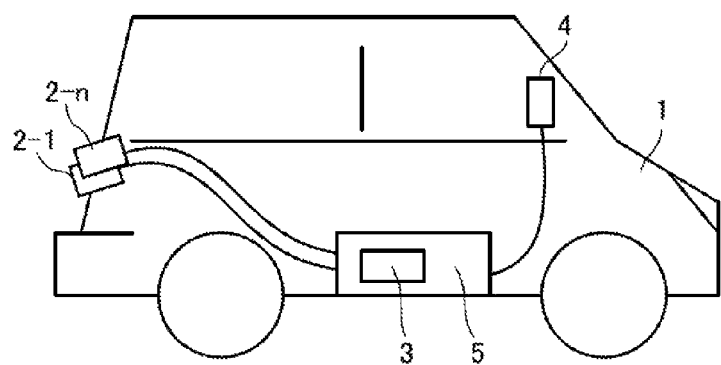
FIG. 3 is a configuration diagram showing a construction of the drive assist display apparatus according to first and second embodiments of the present invention.

While there has been described in the forgoing description about the fact that the image processing section 3 is accommodated in the vehicle-mounted camera 2, the image processing section 3 may be accommodated in the monitor 4 as shown in FIG. 2. The image processing section 3 may also be accommodated in an image processing apparatus 5 as shown in FIG. 3. As shown in FIG. 3, the vehicle-mounted camera 2 may be replaced by a plurality of vehicle-mounted cameras 2-1 to 2-$n$ each having a non wide-angle lens.

While there have been shown in FIGS. 1 to 3 about the fact that the vehicle-mounted camera 2 is mounted on the rear side of the vehicle, the vehicle-mounted camera 2 may be mounted on the front side of the vehicle. In the first and second embodiments of the present invention, the vehicle-mounted camera 2 is described as mounted on the rear side of the vehicle.

Figure 4:
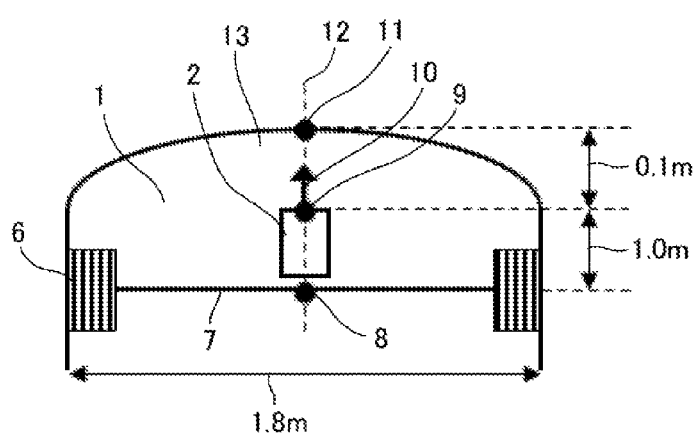
FIG. 4 is a conceptual diagram showing a detailed mounted state of a vehicle-mounted camera with respect to a vehicle.
Figure 5:
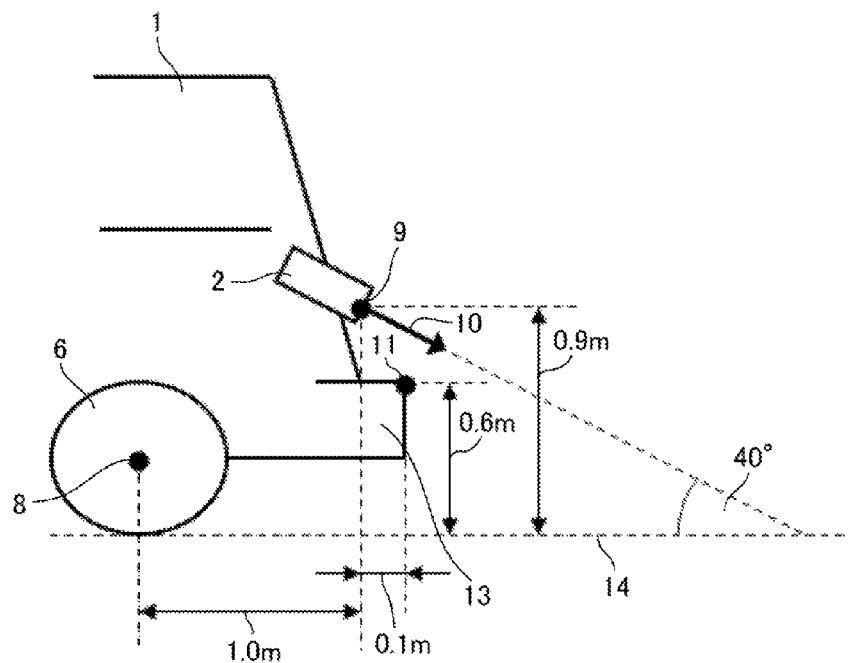
FIG. 5 is a conceptual diagram showing a detailed mounted state of the vehicle-mounted canteen with respect to the vehicle.

Hereinafter, an example of an imaging condition will be described with reference to FIGS. 4 to 8. FIGS. 4 and 5 each shows a detailed mounted state of the vehicle-mounted camera 2 with respect to the vehicle 1.

FIG. 4 shows an overhead view of the backward of the vehicle 1. The reference sign 12 indicates a vehicle left-right center line passing through a center of left and right sides of the vehicle 1. The reference sign 6 indicates a rear wheel of the vehicle 1. The reference sign 7 indicates a rear axle of the vehicle 1. The reference sign 8 indicates a center point of left and right edges of the rear axle 7 on the vehicle left-right center line 12. The reference sign 9 indicates a position of the lens of the vehicle-mounted camera 2 on the vehicle left-right center line 12. The reference sign 10 indicates an optical axis of the lens of the vehicle-mounted camera 2. The optical axis 10 is in parallel relationship with the vehicle left-right center line 12. The reference sign 13 indicates a rear bumper of the vehicle 1. The reference sign. 11 indicates a rear edge portion of the vehicle on the vehicle left-right center line 12 and the bumper 13. The vehicle 1 has a width of 1.8 m. The position 9 of the lens has a distance of 1.0 m to the rear axle 7 and a distance of 0.1 m to the rear edge portion 11 of the vehicle 1.

FIG. 5 shows a side view of the backward of the vehicle 1. The reference sign 14 indicates the horizontal ground surface. The position 9 of the lens is at 0.9 m in height from the horizontal ground surface 14. The optical axis 10 has an angle of 40 degrees with respect to the horizontal ground surface 14. The rear edge portion 11 of the vehicle is at 0.6 m in height from the horizontal ground surface 14.

Figure 6:
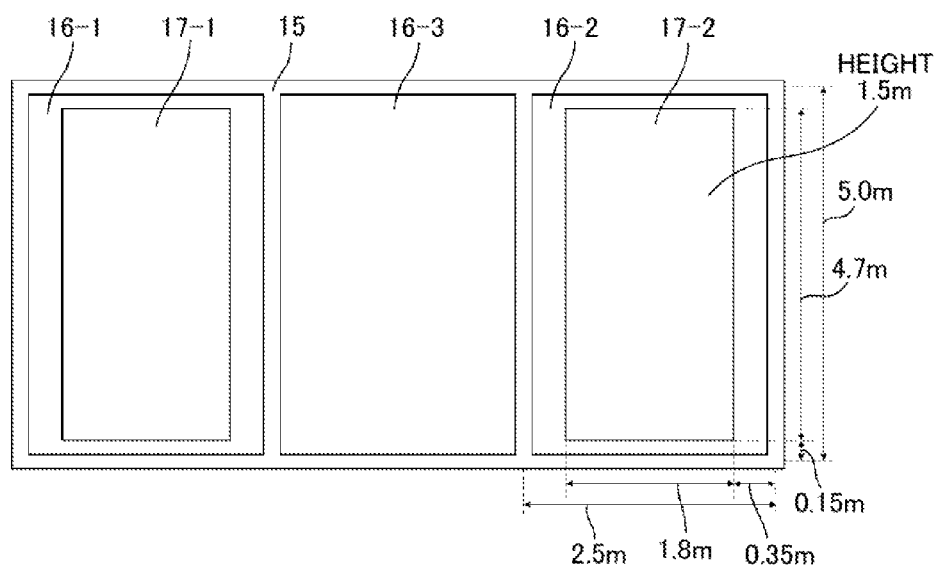
FIG. 6 is a conceptual diagram showing size of a parking lot and peripheral vehicles as an example of a subject.

FIG. 6 shows sizes of parking spaces and sizes of parked vehicles as examples of subjects. The reference signs 16-1, 16-2 and 16-3 respectively indicate left, right and center parking spaces. The reference sign 15 indicates white lines drawn on the horizontal ground surface 14 to form the left, right and center parking spaces 16-1, 16-2 and 16-3.

The left, right and center parking spaces 16-1, 16-2 and 16-3 have the same size with one another. Each parking space 16-1, 16-2 and 16-3 has a length of 5.0 m and a width of 2.5 m on the center of thickness of the white line 15 basis. The reference sign 17-1 indicates the vehicle parked in the left parking space 16-1 and assumed to have a shape of a cuboid. The reference sign 17-2 indicates the vehicle parked in the right parking space 16-2 and assumed to have a shape of a cuboid.

The vehicles 17-1 and 17-2 have the same size, each having 1.8 m in width, 4.7 m in length and 1.5 m in height, and parked at a center of the respective left and right parking spaces.

Figure 7:
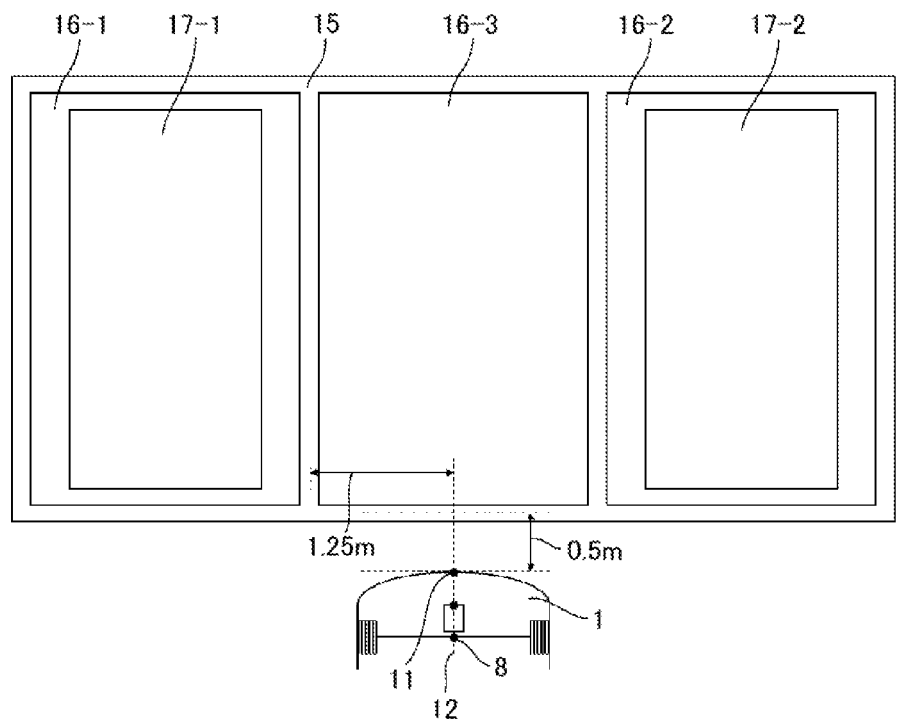
FIG. 7 is a conceptual diagram showing an example of a positional relationship between the parking lot and the vehicle.

FIG. 7 shows an example of a positional relationship between the parking lot shown in FIG. 6 and the vehicle 1. In this example, the vehicle left-right center line 12 passes thorough a center of width of the center parking space 16-3. The rear edge portion 11 of the vehicle is at 0.5 m away from the near side white line forming the center parking space 16-3.

Figure 8:
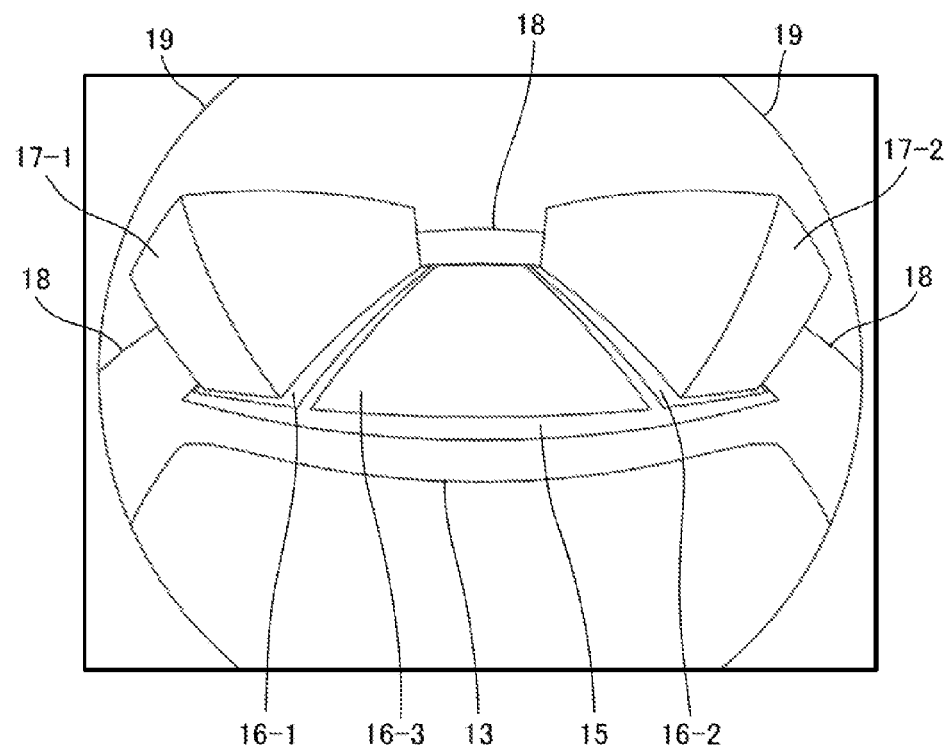
FIG. 8 is a conceptual diagram showing a taken image.
Figure 9:
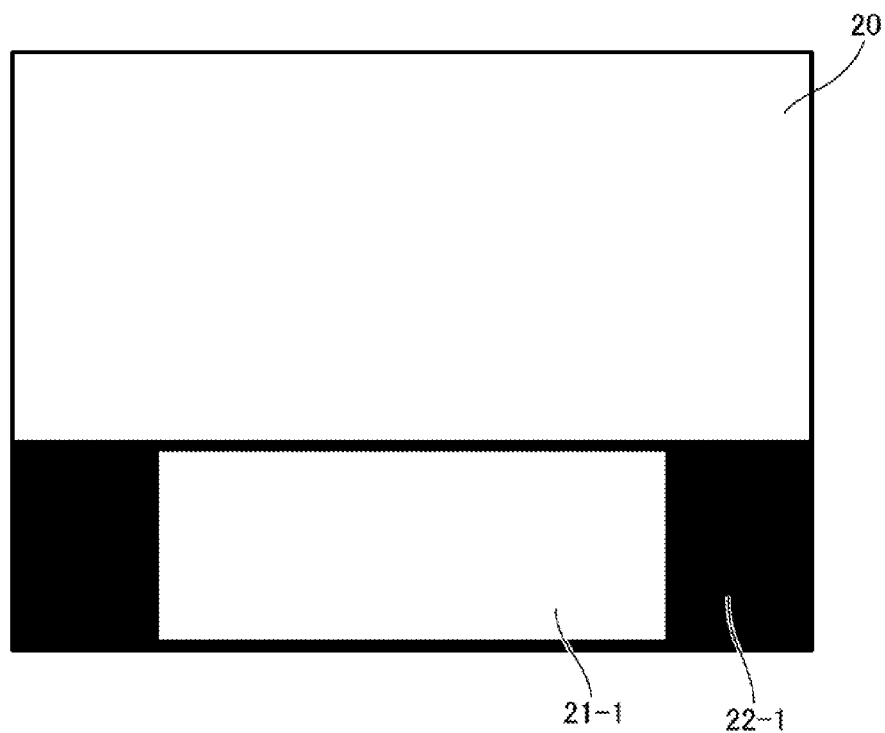
FIG. 9 is a conceptual diagram showing a displayed image processed by a conventional image processing.
Figure 10:
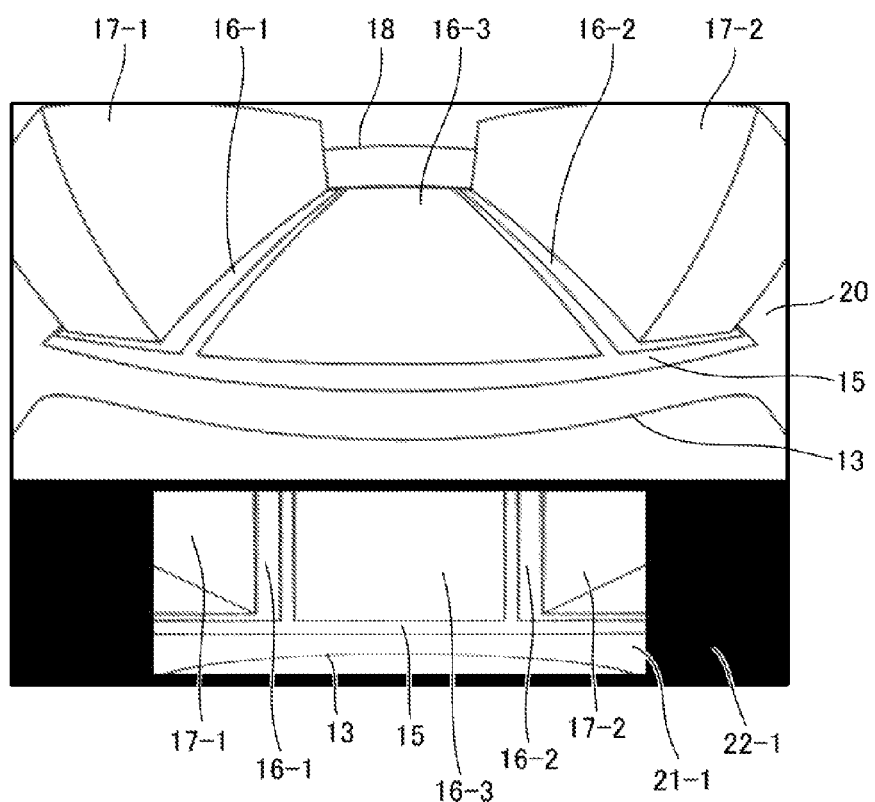
FIG. 10 is a conceptual diagram showing a displayed image processed by a conventional image processing.

FIG. 8 shows an image taken by the vehicle-mounted camera 2 under the state shown in FIG. 7. The reference sign 18 indicates an image of the horizon taken under the state that no solid object exists in front of the vehicle-mounted camera 2. The reference sign 19 indicates an image circle assumed to be taken with an angle at 90 degrees around the optical axis of the lens.

Hereinafter, an operation of the image processing section 3 will be explained.

Figure 11:
FIG. 11 is a conceptual diagram showing a displayed image processed by an image processing according to the first embodiment of the present invention.
Figure 12:
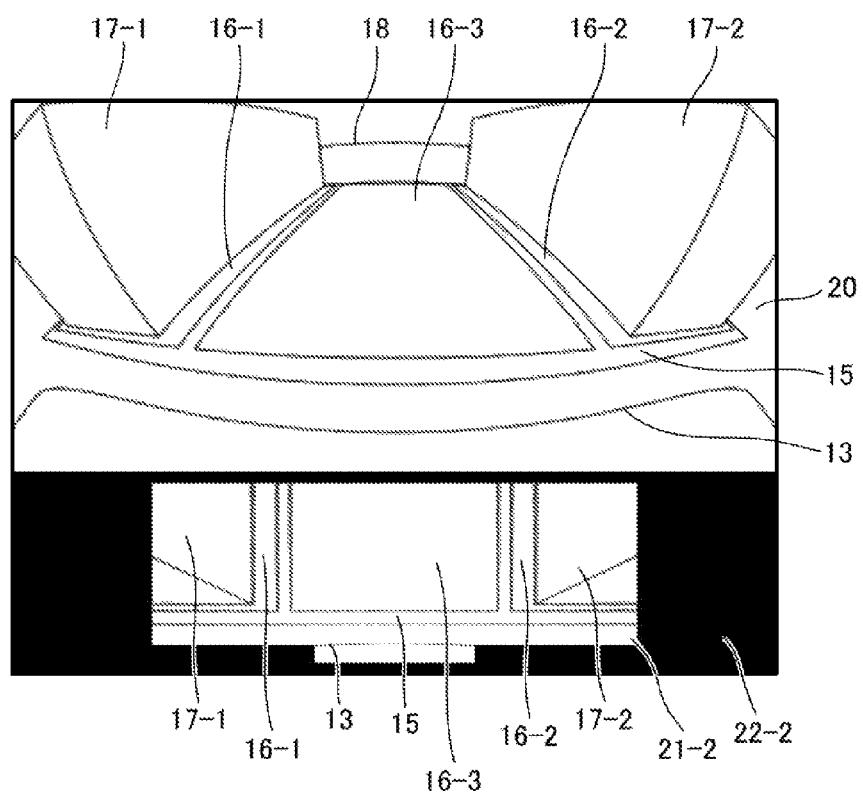
FIG. 12 is a conceptual diagram showing a displayed image processed by an image processing according to the first embodiment of the present invention.

FIGS. 11 and 12 show the displayed images displayed on the monitor 4 which are respectively obtained by the same processing of the image processing section 3 from the taken images.

In general, the whole image of the backward of the vehicle is horizontally flipped before displaying. However, in the first and second embodiments of the present invention, the whole image of the backward of the vehicle is not horizontally flipped before displaying for better understanding of a left-to-right relationship between the taken image and the display image.

FIG. 11 shows an arrangement of the images processed by the image processing section 3 within a display range of the monitor 4. The reference sign 20 indicates a main view showing an clipped image of a wide backward area of the vehicle from the taken image. The clipped image is obtained by cut away left, right, top and bottom parts from the taken image shown in FIG. 8. In detail, the main view 20 shows an image of an imaging range that moderately covers a part of a bumper 13 of the vehicle 1 in a down side region and parts of the vehicles respectively parked in the left and right parking spaces in an up side region, and has an angle of view about 160 degrees between left and right sides.

While there has been described in the forgoing description about the fact that the main view 20 shows the image clipped from the taken image, the main view 20 may show an image corrected from the taken image to represent the wide area.

The reference sign 21-2 indicates a sub view showing the view point conversion image of a vicinity of the vehicle 1 as if looked down from the virtual viewpoint. The sub view 21-2 has a down side region where a thickness of the view point conversion image of the bumper 13 from the taken image is moderately represented and left and right side regions except the region of the bumper 13 where the taken image of the area around the vehicle is substantially shown. The sub view 21-2 is formed as provided with a cutout section having a width corresponding to a width of the vehicle in accordance with a reduction scale of the view point conversion image. The reference sign 22-2 indicates a mask picture view filling a space between the main and sub views 20 and 21-2 without the taken image.

In case that the taken, image shown as FIG. 8 is processed by the image processing section 3 as described above, the processed image is shown as FIG. 12. Accordingly, if the bumper 13 is shown without reaching the neighbor parking space, an impression of the vehicle colliding with the vehicles parked at the respective left and right parking spaces 17-1 and 17-2 is erased.

As will be seen from the foregoing description, it is to be understood that the embodiment of the present invention can show the image of the part of the actually taken vehicle in sub view, thereby leading to the fact that the image of the vehicle is displayed in actual color and brightness at the time of imaging. Therefore, the image of the vehicle can be easily recognized. In addition, the drive assist display apparatus of the present invention can represent the width of the easily recognized part of the vehicle in accordance with a reduction scale of the view point conversion image, thereby leading to the fact that the size of the vehicle can be correctly recognized.

Second Embodiment

In contrast to the sub views shown in FIGS. 11 and 12, FIGS. 13 and 14 each shows the sub view formed as provided with the cutout section having round sides.

Figure 13:
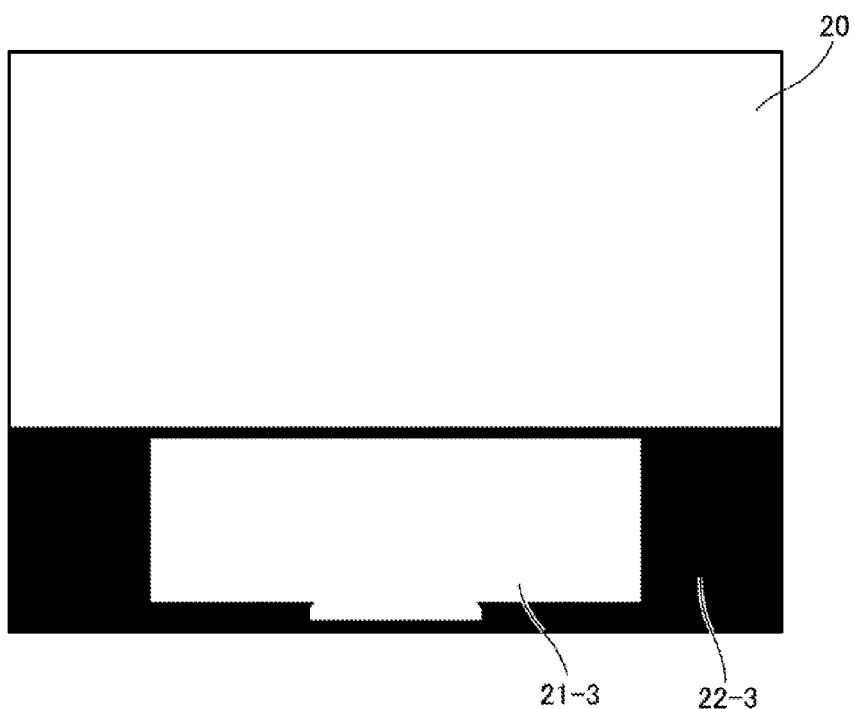
FIG. 13 is a conceptual diagram showing a displayed image processed by an image processing according to the second embodiment of the present invention.
Figure 14:
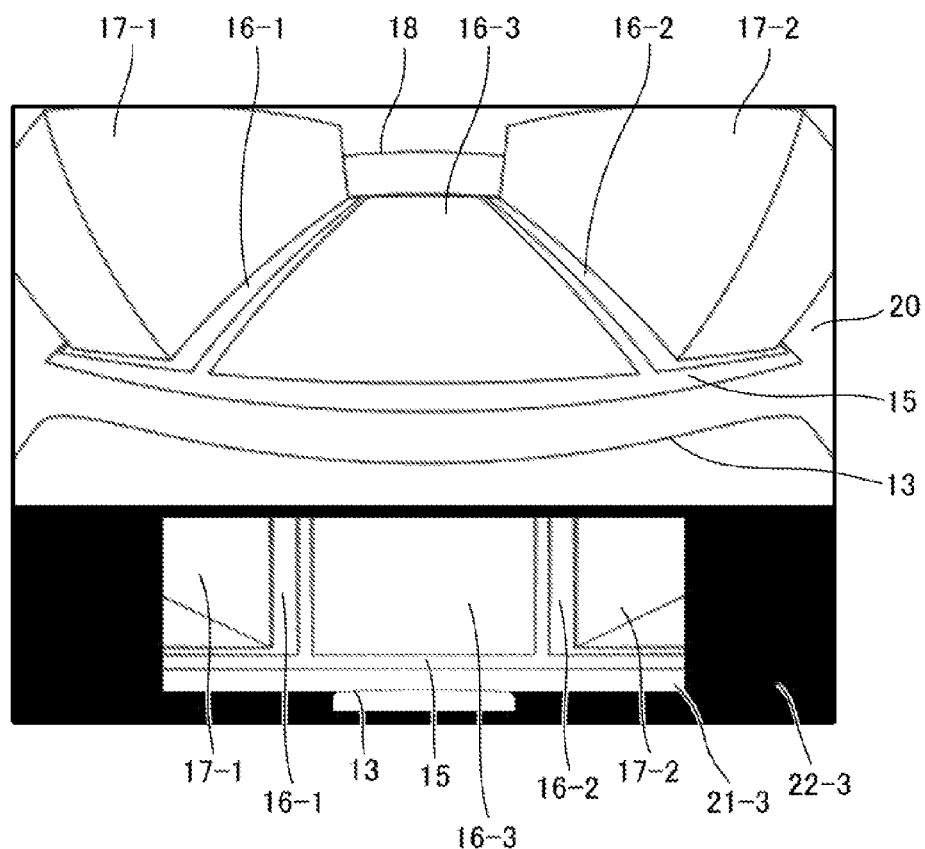
FIG. 14 is a conceptual diagram showing a displayed image processed by an image processing according to the second embodiment of the present invention.

In FIG. 13, the reference sign 20 indicates a main view similar to that of the first embodiment of the present invention. The reference sign 21-3 indicates the sub view formed as provided with the cutout section having round sides, in contrast to the sub view 21-2. The reference signs 22-3 indicates a mask picture view filling a space between the main and sub views 20 and 21-3 without showing any taken image.

In case that the taken image shown as FIG. 8 is processed by the image processing section 3 as described above, the processed image is shown as FIG. 14.

As will be seen from the foregoing description, it is to be understood that the embodiment is designed to make round in form of the part representing the width between the left and right sides as the part of the vehicle in the sub view. Therefore, the image of the vehicle can be further easily recognized.

INDUSTRIAL APPLICABILITY

The drive assist display apparatus of the present invention is widely available for a drive assist display apparatus which can display the imaging range needed for the parking point adjustment, and make an easy recognition of the accurate width of the vehicle for the purpose of assisting the driver on smoothly parking the vehicle at the time of fine parking point adjustment.

REFERENCE SIGNS LIST

1 Vehicle
2 Vehicle-Mounted Camera
2-1 to 2-*n* Vehicle-Mounted Camera
3 Image Processing Section
4 Monitor
5 Image Processing Apparatus
6 Rear Wheel
7 Rear Axle
8 Center Point of Left and Right Edges of the Rear Axle
9 Position of Lens
10 Optical Axis
11 Rear Edge Portion of the Vehicle
12 Vehicle Left-Right Center Line
13 Bumper
14 Horizontal Ground Surface
15 White Line
16-1 Left Parking Space
16-2 Right Parking Space
16-3 Center Parking Space
17-1 Vehicle Parked in the Left Parking Space
17-2 Vehicle Parked in the Right Parking Space
18 Horizon
19 Image Circle
20 Main View
21-1, 21-2, 21-3 Sub View
22-1, 22-2, 22-3 Mask Picture View

The invention claimed is:

1. A drive assist display apparatus comprising:
one or more imaging sections operable to take an image of a wide area of one of rear and front of a vehicle;
an image processing section operable to create a main view showing an image of a wide area around the vehicle by clipping or correcting from the image taken by the imaging sections, create a sub view showing a view point conversion image of a vicinity of the vehicle from the image taken by the imaging sections as if looked down from a virtual viewpoint, combine the main view with the sub view, and fill a space between the main view and the sub view with a mask picture without showing the image taken by the imaging sections; and
an image displaying section operable to display the image processed by the image processing section, wherein:
the drive assist display apparatus is designed to display the sub view to show the view point conversion image including a view point conversion image of the vehicle from the taken image;
the sub view is formed as provided with a bumper-shaped cutout section corresponding to a fixed part of the vehicle, the bumper-shaped cutout section having a width corresponding to a width of the vehicle in accordance with a reduction scale of the view point conversion image; and
the drive assist display apparatus is designed to make sides of the bumper-shaped cutout section round in form,
wherein, the main view shows an image of an imaging range that covers a part of a bumper of the vehicle in a downside region and parts of vehicles parked in the left and right parking spaces in an upside region, and has an angle of view of at least 160 degrees between the left and the right parking spaces.

* * * * *